Figure 3:
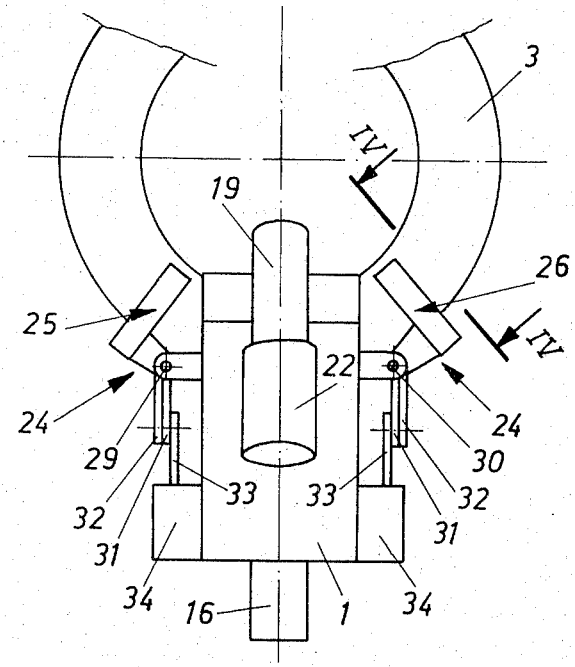

United States Patent [19]
Steffel

[11] 3,809,900
[45] May 7, 1974

[54] APPARATUS FOR THE CONTINUOUS, OVERALL X-RAY EXAMINATION OF A MOTOR VEHICLE TIRE

[75] Inventor: Horst Steffel, Lubeck-Gothmund, Germany

[73] Assignee: Collmann GmbH & Co. Spezialmachinenbau KG

[22] Filed: Dec. 12, 1972

[21] Appl. No.: 314,322

[30] Foreign Application Priority Data
Aug. 8, 1972  Germany............................ 2239003

[52] U.S. Cl................ 250/321, 250/360, 250/368, 250/460, 250/490
[51] Int. Cl. ........................................... G01t 1/00
[58] Field of Search............ 250/275, 321, 358–360, 250/460, 490, 491, 492, 307, 308, 272, 277, 213 VT, 368

[56] References Cited
UNITED STATES PATENTS

| | | | |
|---|---|---|---|
| 3,621,246 | 11/1971 | Horsey | 250/360 |
| 2,301,251 | 11/1942 | Capen | 250/360 |
| 2,700,116 | 1/1955 | Sheldon | 250/213 VT |
| 2,667,585 | 1/1954 | Gradstein | 250/213 VT |
| 2,063,989 | 12/1936 | DuMond | 350/460 |

*Primary Examiner*—James W. Lawrence
*Assistant Examiner*—Harold A. Dixon

[57] ABSTRACT

This invention relates to apparatus for the continuous, overall X-ray examination of a driven motor vehicle tire which is rotatably supported in an expanded state and comprising X-ray apparatus for irradiating the tire from its interior and utilising a sensing camera arrangement having a monitor to reproduce the X-ray picture appearing on at least one fluorescent screen. The invention provides one lateral X-ray tube adjacent each side of the tire to irradiate the side-wall of the tire remote therefrom. An external fluorescent screen is associated with each of the areas of the tire to be irradiated, and the sensing camera apparatus is arranged subsequent to the fluorescent screens. Preferably, but not necessarily, a further X-ray tube is provided for irradiating the tire tread.

12 Claims, 5 Drawing Figures

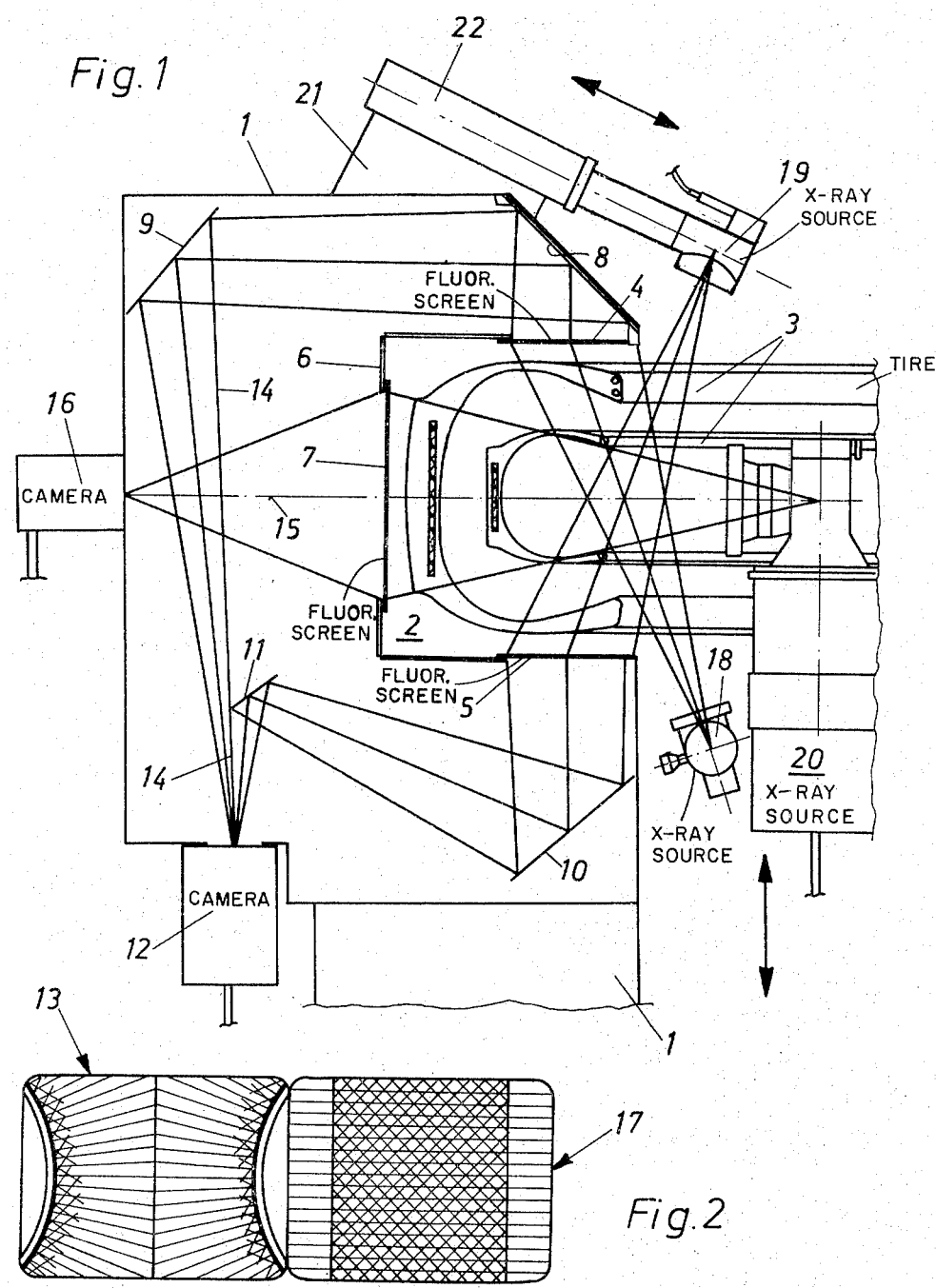

APPARATUS FOR THE CONTINUOUS, OVERALL X-RAY EXAMINATION OF A MOTOR VEHICLE TIRE

The present invention relates to an apparatus for the continuous, overall X-ray examination of a driven motor vehicle tire rotatably supported in an expanded state, by means of X-ray beams irradiating the tire from its interior and by means of a sensing-camera apparatus with a monitor for reproducing the X-ray picture apparatus on at least one fluorescent screen.

An apparatus is known for examining pneumatic motor vehicle tires, especially belted tires, for internal manufacturing defects by means of X-rays in which an X-ray tube is provided to irradiate the driven tires which is rotatably supported in an expanded form from the inside. A sensing-camera unit is arranged on a pivoting arm from the fluorescent screen of which the sectional X-ray picture of the area of the revolving tire being irradiated is picked up and directed to the monitor arranged subsequent to the camera unit for visual examination. Complete examination of a motor vehicle tire, especially a lorry tire, takes an understandably long time with this known apparatus, since the procedure for complete irradiation i.e. irradiation of the side-walls and the tread of the tire, is such that first one side-wall is irradiated, then the tread and finally the other side-wall. Thus at least three revolutions of the mounted tire are required. Moreover, this process of irradiation is also time-consuming because, in certain circumstances, re-adjustment of the X-ray tube has to be undertaken after each revolution for the next stage of operations and the pivoting arm with the camera also has to be appropriately re-adjusted. Another disadvantage is that if the X-ray tube is to be set up only once for the size of tire, it being the intension to study the tire-beads at the same time, the examination of the sidewalls of the tire can only be performed in an inadequate fashion since a highly distorted X-ray picture appears on the fluorescent screen of the camera unit and thus on the monitor due to the beam-path of the X-rays.

It is thus an object of the invention to provide apparatus for the continuous overall X-ray examination of a motor vehicle tire in which it is possible, while eliminating or minimising the disadvantages previously mentioned, to make an overall X-ray examination of a motor vehicle tire during a single revolution thereof.

Other objects and advantages will become apparent hereinafter.

Accordingly, the invention consists in providing in the apparatus hereinbefore set forth for the driven, orientated tire, adjacent each side of the tire a lateral X-ray tube each of said lateral tubes being arranged for irradiating the side-wall of the tire remote from it, an external fluorescent screen being associated with each of the areas of the tire to be irradiated, the sensing-camera device being arranged subsequent to the fluorescent screens. Preferably, but not necessarily, an X-ray tube is also provided for irradiating the tire tread.

Advantageously the X-ray tube for irradiating the tire-tread is arranged to be brought into the central plane or approximately into the central plane of the tire which is supported in the recumbent position, and one lateral X-ray tube is provided above the tire and the other lateral X-ray tube is provided below the tire, the points of focus of the lateral X-ray tubes being situated in the operating position in a common vertical plane which extends through the optical axis between the point of focus of the X-ray tube for the tire-tread and a first sensing camera, or extends almost parallel thereto. It is a further feature that the first sensing camera with its monitor is associated with the fluorescent screen for the tire-tread while a mirror arrangement is set-up subsequent to the lateral fluorescent screens, to which is attached a second sensing camera with a monitor for both side-walls of the tire, or a second sensing camera and an image-mixer to reproduce the X-ray pictures of the side-walls of the tire on the first monitor.

Using this solution it is possible to make an overall X-ray examination of a motor vehicle tire in an economical fashion with a single revolution of the tire, i.e. the two side-walls and the tread of the segmental section of the tire being irradiated are irradiated simultaneously and the X-ray pictures of them are examined simultaneously by visual means on the display screens of the monitors. While the monitor associated with the first sensing-camera shows the tread, the monitor associated with the second camera reproduces the two X-ray pictures of the side walls of the tire as a composite picture by means of the mirror arrangement. The two monitors can be set up next to one another or above one another and can be observed by a single operator. The time devoted purely to examination is thus reduced by approximately 66 percent, there being now one revolution of the tire in contrast to the three revolutions previously claimed in known apparatus, which signifies a considerable increase in the rate of examination per unit time. Using an automatic feed and mounting set-up, the rate of examination with the apparatus according to the invention can be increased even further which is of special advantage in connection with automatic tire-manufacturing lines. The proposed apparatus also has the advantage that all current sizes of tire can be examined in a time-saving fashion in one apparatus, the whole irradiated area of each section of the tire being reproduced undistorted or substantially undistorted, so that defects are sure to be recognised. Moreover, the advantage of the mirror arrangement is that a tire-sensing camera for observation of the side of the tire is thereby saved.

Figure 5:
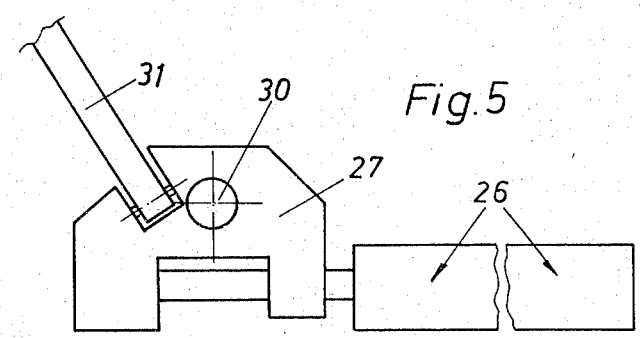
Figure 4:
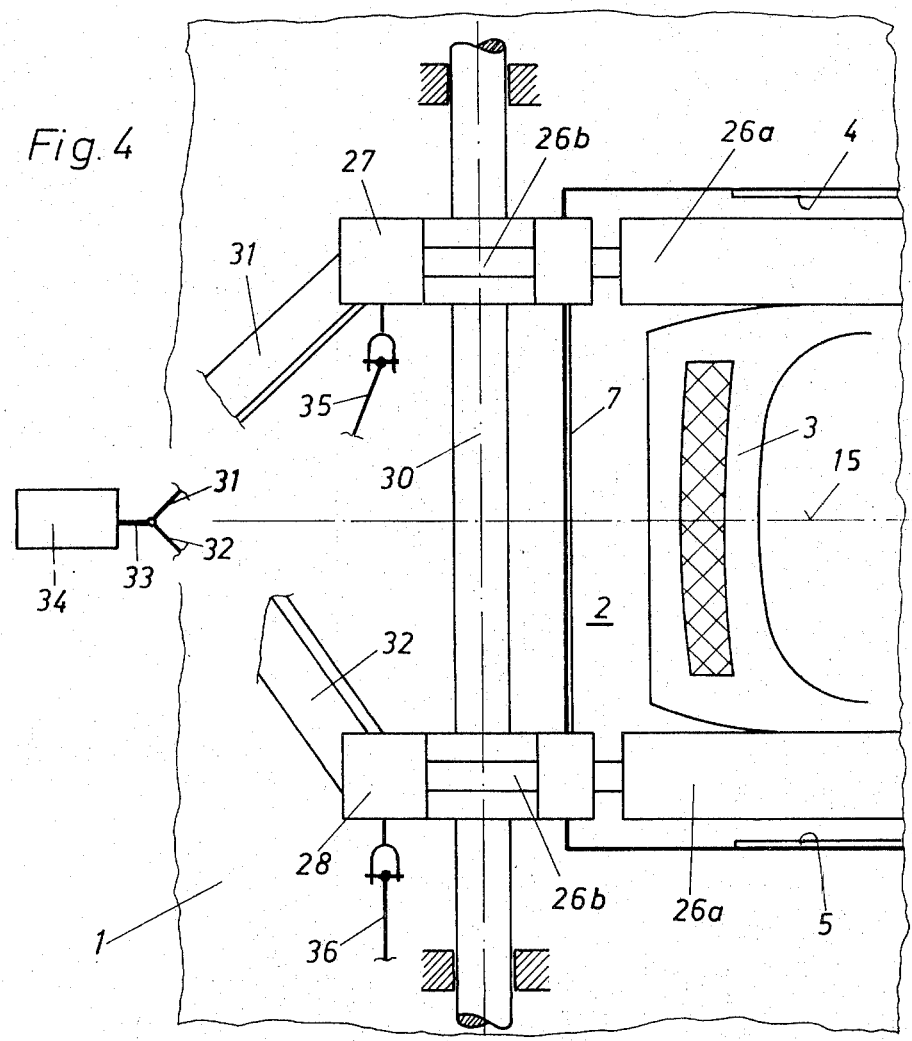

In order that the invention may be more clearly understood reference will now be made to the accompanying drawings, which show one embodiment thereof by way of example and in which:

FIG. 1 shows a schematic, vertical, axial section through an apparatus according to the invention, FIG. 2 shows the X-ray pictures of the section of tire being irradiated as reproduced by the monitors, FIG. 3 shows a simplified plan view of an apparatus according to the invention, FIG. 4 shows a schematic view on line IV—IV of FIG. 3, and FIG. 5 shows a vertical view of the representation in FIG. 4.

Referring now to the drawings, according to FIG. 1 a light-excluding housing 2 with a throat-like passage way 2 for a motor-vehicle tire 3 to be examined rests on a pedestal, stand, or the like (not shown), the external form of the light-excluding housing being shown approximately in FIGS. 1 and 3. The tire 3, which is supported to rotate about its normal axis of rotation in an expanded form and in a recumbent position, is so driven that a segmental section of the tire passes through the passage way 2 and, in the course of this, is irradiated by X-rays from inside, i.e. in the direction of the inner walls of the tire. In the cross-section in FIG. 1 the passage-way is square-cornered and of such a size that tires of current sizes fit into it and can be irradiated at the same time; to demonstrate this possibility two tires are shown in FIG. 1. Lateral fluorescent screens 4, 5 lying parallel and opposite are associated externally with the side-walls of the tire associated with the section of tire passing through the passage way 2, and are attached to the housing 1 in the passage way. A fluorescent screen 7 is also provided in the rear-wall 6 of the passage way and is situated opposite and parallel to the tread of the tire. Subsequent to each lateral fluorescent screen 4, 5 is arranged a pair of re-directing mirrors fastened in the housing 1, incorporating mirrors 8, 9 or 10, 11 respectively which relay the X-ray picture of the tire appearing on the lateral fluorescent screens along the indicated beam-paths to a second sensing-camera 12 rigidly fastened to the housing. Both individual pictures are passed on at the same time by this camera to a standard monitor (not shown) arranged subsequent to this camera on whose display screen 13 (FIG. 2) the irradiated sections of the tire side-walls then appear and can be examined visually. If the two individual pictures should not be separated from one another on the display screen 13 by a gap then a procedure is adopted in harmony with the lateral fluorescent screens 4, 5 and the X-ray irradiation according to FIG. 1 which has yet to be explained such that one lateral edge of the re-directing mirror 11 arranged nearest to the camera 12 extends as far as the optical axis 14 of the camera 12, while the re-directing mirror 9 arranged in the higher position extends at least as far as this axis.

Furthermore, the re-directing mirrors of the two pairs of mirrors are so arranged that the beam-paths between the lateral fluorescent screens 4, 5 and the lens of the second sensing camera are of equal length so that it is ensured that the X-ray picture is reproduced on the screens of the monitors in a well defined form.

Advantageously, the optical axis of a first sensing camera 16 to pick up the X-ray picture of the tire-tread appearing on the screens 7 extends through the centre of the fluorescent screen 7 in the passage way 2. The camera 16 is also rigidly fastened to the light-excluding housing 1 and is followed by a second standard monitor, which is not shown, on whose display screen 17 of the picture of the irradiated tire-tread appears and can be examined visually.

Three X-ray tubes 18, 19, 20 are provided to irradiate the tire 3 from its interior, the tubes 18 and 19 being intended to irradiate the side-walls of the tire and the tube 20 being intended to irradiate the tread of the tire. The point of focus of the tube 20 can be moved into the central plane or approximately into the central plane of the tire 3 to coincide with the optical axis 15 and take up the X-ray position, by being lifted, and can be moved away again by being lowered, and so irradiates the tire that the tire-beads are not irradiated at the same time. For this purpose the tube 20 is secured to a console (not shown) which is mounted so as to be able to be raised and lowered either at the bottom of the housing 1 or on the stand associated therewith.

Of the two lateral X-rays tubes 18 and 19 for irradiating the side-walls of the tire, the upper tube 19 is also designed to be movable in its operating position, while the lower tube 18 is arranged to be fixed, to the housing 1 for instance, but may also be arranged to be movable, e.g. in conjunction with the tube 20 on the console referred to above. The upper tube 19 is mounted in a tube 22 attached by means of a support 21 to the housing 1, into which tube it is retracted when the apparatus which holds the tire 3 and is of no further interest swings the next tire in and out. Once the upper lateral X-ray tube 19 has taken up its operating position, its point of focus is situated in a common vertical plane in which the point of focus of the lower lateral X-ray tube 18 also lies, and this plane also extends through the point of focus of the X-ray tube 20 and through the optical axis 15 of the first sensing camera 16, which also passes through this latter point of focus. The vertical plane may also be situated in close proximity to the optical axis 15 and parallel to the latter. The lateral fluorescent screens 4, 5 are accordingly arranged vertically above one another so that the X-ray pictures of the sides are not reproduced in a distorted fashion with respect to one another. Furthermore, each lateral X-ray tube is so positioned opposite the tire that each tube irradiates the section of the side-wall of the tire 3 remote from it and projects the X-ray picture onto the lateral fluorescent screen 4 or 5 situated behind it. Thus, the upper tube 19 irradiates the lower side-wall of the recumbent tire 3 and vice versa. For this purpose, the lateral fluorescent screens are preferably of such dimensions or so arranged, that only the projected picture of the remote side-wall of the tire in question appears on the appropriate lateral fluorescent screen. It is thus ensured that only the X-ray picture of a single section of side-wall appears on a lateral fluorescent screen so that distortions and lack of definition resulting from superimposition of pictures are avoided. In the area of the passage way 2 the central plane of the recumbently supported and expanded tire 3 is made to coincide exactly with the optical axis of the first sensing camera by an adjusting apparatus 24 which is arranged on the preferably fixed light housing 1. The adjusting apparatus 24 consists of two pairs of rollers 25, 26 provided on either side of the passage way, each having rollers 25a or 26a arranged above one another and gripping the tire between them. Axial cores 25b and 26b of the rollers 25a or 26a are freely mounted on vertical guide rods 29 and 30 secured to the housing 1 via upper and lower bearings 27 or 28. Levers 31 or 32 are articulated to the bearings 27 and 28 respectively and a double elbow lever formed from an upper and a lower elbow lever engages with a piston rod 33 associated with an associated pressure-drive 34 so that the rollers 25a and 26a of each pair of rollers can be moved in opposite directions to one another to line up tires of different width, the centering plane of the rollers always coinciding with the optical axis 15. Preferably the two pressure-drives 34 are also secured to the light-excluding housing.

According to a further feature of the invention the rollers 25a and 26a in each pair of rollers 25 or 26 are driven to rotate the tire to be irradiated. For this purpose, the axial cores 5b and 26b of the rollers are connected to schematically shown universally-jointed shafts 35 and 36 which are displaced in rotation by drives which are not shown, transmission of rotary motion from the universally-jointed shafts to the axial cores taking place via gearing (not shown) accommodated in the bearing 27, 28.

As a modification of the previously-described embodiment, the procedure may be such that a standard image mixer (not shown) is used instead of the monitor for the second sensing camera, this mixer causing the X-ray pictures of the side-walls of the tire to be reproduced on the monitor of the first sensing camera. In this way, one monitor can be dispensed with.

As a further modification, the procedure may be such that the mirror arrangement 8, 9, 10, 11 is omitted and a sensing camera with a monitor is directly arranged subsequent to each fluorescent screen 4, 5, 7. For this, an image-mixer may also be used in conjunction with one or two monitors. For example, the first sensing camera 16 with appropriate monitor can be associated with the fluorescent screen 7 while the two sensing cameras for the side-walls of the tire can be connected together into an image-mixer which feeds its signals to a common monitor. Re-directing mirrors may be used here if the intention is, for example, to arrange all the sensing-cameras next to one another or at one side of the light-excluding housing 1 in a specific configuration.

Furthermore, a zoom lens may be available on one, several or all of the sensing camera. This is especially advantageous for small tires, firstly because the X-ray pictures of them appear enlarged on the display screen of the monitor or monitors so that the inserts or the manufacturing defects in these tires are better able to be seen, and secondly because the display screen of the monitor or monitors is more fully used.

The embodiment described utilises three X-ray tubes. If desired, however, the X-ray tube 20 for the tire-tread and the subsequent sensing camera arrangement, including the fluorescent screen 7 can be omitted. There then remain only the appropriate lateral X-ray tubes on either side of the tire with their associated equipment whose possible alternative applications in the relevant application also apply in the case of this embodiment. An area of application for this embodiment is, for example, for car tires in the case of which it is, in certain cases, sufficient to examine or irradiate only the side-walls of the tire.

I claim:

1. In a system including an X-ray source, a camera and monitor therefor, tire support structure, camera support structure, the X-ray source relative to the tire support structure and relative to the camera support structure positioned such that X-rays are beamable between tire beads and through one thickness of a tire body with beamed X-rays being in a direction and with the camera being located for receiving an image resulting from the beamed X-rays with the image being receivable from a point adjacent the tire body on a side thereof away from the side on which the X-ray source is located, and rotation mechanism for rotating the tire body relative to the X-ray support structure and relative to the camera support structure, the improvement comprising: at least a first X-ray source means aimed to be directed at a first one tire-side when a tire is mounted on the tire mounting structure and at least a second X-ray source means simultaneously aimed to be directed at a different tire-side when a same tire is mounted on the tire mounting structure; at least a first fluorescent screen mounted at a position adjacent a first side of a same mounted tire, at a location opposite from the first X-ray source means positioned to receive X-rays from the first X-ray source means; said sensing camera being positioned to receive an image from the first fluorescent screen as X-rays strike the first fluorescent screen, at least a second fluorescent screen mounted adjacent a different tire-side of the same tire when mounted, at a location opposite from the second X-ray means positioned to receive X-rays from the second X-ray source means; said sensing camera being further positioned to simultaneously receive an image from said second fluorescent screen; whereby separate fluorescent X-ray images of both of opposite spaced-apart different tire-sides are simultaneously monitorable, whereby said camera simultaneously receives at different angles fluorescent images from both said first fluorescent screen and said second fluorescent screen; and mirror means of at least one mirror positioned to reflect an image into said single camera from at least one of said first and second fluorescent screens.

2. The improvement of claim 1, in which said first X-ray source means is positioned at a first predetermined distance from the first fluorescent screen and from a tire-side when mounted to be X-rayed, and the second X-ray source means is positioned a second predetermined distance from the second fluorescent screen and from a different tire side when mounted to be X-rayed, and the single camera and the mirror means are positioned predetermined distances from the first and second fluorescent screens, such that the separate tire areas being X-rayed are substantially equal and such that separate fluorescent screen images of the first and second fluorescent screens are substantially equal in area on respective screens, and such that the distances traveled by the respective fluorescent images from the first and second fluorescent screens to the single camera are substantially equal, whereby visually monitored images are of comparable intensity and size enabling ready reliable undistorted comparison of the commonly simultaneously visually displayed fluorescent images.

3. The improvement of claim 2, further including at least a third X-ray source means simultaneously aimed to be directed at a tire tread between said first one tire-side and said second different tire-side when the same tire is mounted, and including a third fluorescent screen position to receive X-rays passed through a tire tread passed from said third X-ray source means.

4. The improvement of claim 1, further including at least a third X-ray source means simultaneously aimed to be directed at a tire tread between said first one tire-side and said second dirrerent tire-side when the same tire is mounted, and including a third fluorescent screen position to receive X-rays passed through a tire tread passed from said third X-ray source means.

5. The improvement of claim 1, wherein said mirror means comprises two fixed pairs of redirecting mirrors, a first pair of said mirrors being located for reflecting an image between the first fluorescent screen and the first single camera and a second pair of said mirrors being located for reflecting a different image between the second fluorescent screen and the first single camera.

6. The improvement of claim 5, wherein said first pair of mirrors are situated opposite said single camera and disposed in the beam path of the first single camera such that one lateral edge of a mirror of said first pair is positioned closest to the single camera and such that the lateral edge extends up to the optical axis of the first single camera, while a remaining one of said mirrors of said first pair is simultaneously positioned at a greater distance, from an opposite direction up to said optical axis of said single camera.

7. The improvement of claim 6, including an inclosure structure defining a light-excluding housing having a throat-like passage way receiving a portion of a mounted tire to be radiated, enclosing said first and second fluorescent screens, said mirror means, and said single camera, said first and second fluorescent screens being disposed in said passage way positioned substantially parallel to their respective areas of the tire being irradiated.

8. The improvement of claim 1, including aligning means for aligning respective X-ray source means with a tire supported by the support structure, comprising two pairs of rollers provided on either side of said passage way and vise-grippable of the tire at respectively top and bottom faces thereof, said rollers being adjustable with respect to the point of focus of said third X-ray source means for the tire-tread.

9. The improvement of claim 8, wherein said two pairs of rollers consist of rollers movable in opposite directions to one another.

10. The improvement of claim 9, including a vertical guide rod secured to said light-excluding housing, and wherein said rollers in each pair thereof are freely mounted on the vertical guide rod, and including elbow pivot-levers linked to and including a pressure-drive means, for being adjustable in opposite directions to one-another.

11. The improvement of claim 10, wherein said rollers in at least one roller of the two pairs of rollers is drivable in order to rotate a mounted tire.

12. The improvement of claim 1, in which said X-ray sources are located for irradiating against inner-tire surfaces.

* * * * *